(12) United States Patent
Gao

(10) Patent No.: US 7,837,126 B2
(45) Date of Patent: Nov. 23, 2010

(54) METHOD AND SYSTEM FOR COOLING A WIND TURBINE STRUCTURE

(75) Inventor: Meng Gao, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/566,935

(22) Filed: Sep. 25, 2009

(65) Prior Publication Data

US 2010/0133824 A1 Jun. 3, 2010

(51) Int. Cl.
*G05D 22/00* (2006.01)
*F24F 7/00* (2006.01)
*H02K 9/00* (2006.01)

(52) U.S. Cl. .................. 236/44 C; 236/49.3; 62/176.6; 62/259.2; 310/64

(58) Field of Classification Search .............. 236/44 C, 236/49.3; 62/176.6, 186, 259.2; 454/258; 290/45; 310/64
See application file for complete search history.

(56) References Cited

U.S. PATENT DOCUMENTS

| | | | |
|---|---|---|---|
| 5,791,397 A | 8/1998 | Suzuoki et al. | |
| 5,881,806 A | 3/1999 | Rudd | |
| 6,676,122 B1 | 1/2004 | Wobben | |
| 7,044,397 B2 | 5/2006 | Bartlett et al. | |
| 7,057,305 B2 | 6/2006 | Kruger-Gotzmann et al. | |
| 7,168,251 B1 | 1/2007 | Janssen | |
| 7,427,814 B2 | 9/2008 | Bagepalli et al. | |
| 2003/0181158 A1* | 9/2003 | Schell et al. ................. | 454/229 |
| 2008/0041970 A1 | 2/2008 | Hagentoft | |
| 2008/0124213 A1 | 5/2008 | Wobben | |
| 2009/0045628 A1 | 2/2009 | Erdman et al. | |
| 2009/0060748 A1 | 3/2009 | Landa et al. | |
| 2009/0094981 A1 | 4/2009 | Eggleston | |

FOREIGN PATENT DOCUMENTS

| | | |
|---|---|---|
| EP | 1788239 | 5/2007 |
| WO | WO 2007/139507 | 12/2007 |
| WO | WO 2008/092449 | 8/2008 |
| WO | WO 2008/098573 | 8/2008 |

OTHER PUBLICATIONS

Moyer et al., "Assessing Six Residential Ventilation Techniques in Hot and Humid Climates", pp. 1-13, Aug. 2004, Washington, D.C.

* cited by examiner

*Primary Examiner*—Marc E Norman
(74) *Attorney, Agent, or Firm*—Dority & Manning, P.A.

(57) ABSTRACT

A control method and associated component configuration provide cooling for components within a wind turbine structure, such as a tower or nacelle. A recirculating airstream of internal air is established in the structure. For a defined set of operational conditions of the wind turbine that affect a required cooling capacity within the structure, the recirculating airstream is controllably augmented with external air to increase cooling capacity of the recirculating airstream. The amount of external air introduced into the structure is balanced with the amount of relatively hotter internal air within the structure so as to achieve a desired balance of temperature and relative humidity within the structure.

15 Claims, 4 Drawing Sheets

METHOD AND SYSTEM FOR COOLING A WIND TURBINE STRUCTURE

FIELD OF THE INVENTION

The present invention relates generally to the field of wind turbines, and, more particularly, to a system and associated control method for cooling a wind turbine structure, such as a tower or nacelle, that utilize a combination of regulated internal and external airflow for cooling components within the structure.

BACKGROUND OF THE INVENTION

Wind power is considered one of the cleanest, most environmentally friendly energy sources presently available, and wind turbines have gained increased attention in this regard. A modern wind turbine typically includes a tower, a nacelle rotatably supported on the tower, a generator and gearbox housed in the nacelle, and one more rotor blades. The rotor blades capture kinetic energy from wind using known foil principles, and transmit the kinetic energy through rotational energy to turn a shaft that couples the rotor blades to the gearbox, or if a gearbox is not used, directly to the generator. The generator then converts the mechanical energy to electrical energy that may be deployed to a utility grid. With the growing interest in wind generated electricity, considerable efforts have been made to develop wind turbines that are reliable and efficient.

A wind turbine comprises several mechanical and electrical components that generate heat energy losses during their operation. These components include, for example, the gearbox (if provided) and generator that are typically housed in the nacelle. Other heat-generating components may be housed in the tower. For example, a converter and a transformer are typically located in the tower and are utilized to feed electrical energy converted from the mechanical energy of the rotor via the generator into the grid. In addition, one or more controllers for controlling operation of the wind turbine are typically arranged within the tower.

Due to the increased performance and size of modern wind turbines, effective cooling of the above-mentioned components is increasingly difficult, particularly with respect to the heat-generating components within the tower. For example, it has been estimated that for a converter control system operating in a 1.5 MW turbine, about 60 kW is dissipated in heat by the converter. Placement of the converter within the turbine tower without adequate cooling can result in a significant temperature rise within the tower, which may be detrimental to the control system and other components within the tower.

Typically, the heat-generating components in the tower are arranged within a cooling airstream generated by fans. The components may include a heat sink that collects the generated heat, with the heat sink placed directly in the airstream. The heated air rises in the tower and is typically exhausted through vents near the top of the tower. The tower may include additional vents, for example in the tower entry door, to allow the passage of outside air into the lower portion of the tower. However, even with this type of arrangement, it is often difficult to feed enough external air into the tower for sufficient cooling of the components.

In addition, restrictions on tower cooling may also result from geographic location of the wind turbines. For example, offshore and near-shore sites generally do not rely on external air as a cooling medium due to the high salt content and humidity of the air, which would result in a corrosive environment within the tower. These sites use an isolated cooling system, such as an air conditioning system with a heat exchanger. A dehumidifier may also be utilized. Humidity and external temperature are considerations that may significantly limit the available cooling options in a given geographical location.

Accordingly, there exists a need for an improved system and method for cooling components within a wind turbine tower that utilizes the cooling capacity of external air yet controls humidity in the structure within acceptable limits.

BRIEF DESCRIPTION OF THE INVENTION

Aspects and advantages of the invention will be set forth in part in the following description, or may be obvious from the description, or may be learned through practice of the invention.

In accordance with aspects of the invention, a method for cooling components within a wind turbine structure is provided. The wind turbine structure may be, for example, a tower or a nacelle. The method includes establishing a recirculating airstream of internal air within the structure with any suitable configuration of internal air handling components, such as fans, ductwork, dampers, and the like. The recirculating airstream is controllably augmented with external air to increase cooling capacity of the recirculating airstream as a function of a defined set of operational conditions of the wind turbine that affect a required cooling capacity within the structure. The amount of external air introduced into the structure is balanced with the amount of relatively hotter internal air within the structure so as to achieve a desired balance of temperature and relative humidity within the structure.

In accordance with other aspects of the invention, a wind turbine is provided having a tower, a nacelle mounted atop the tower, and a rotor having one or more turbine blades. At least one of the tower or the nacelle constitutes a structural component of the wind turbine that needs cooling. Air handling components within the structural component, for example any configuration of ductwork, dampers, fans, and the like, are configured to establish a recirculating airstream of internal air within the structural component. An external airflow regulator is configured with the structural component and controls access of external air into the structural component, with the external air being relatively cooler than the recirculating internal air. A control system is in operable communication with the internal air handling components and the external airflow regulator whereby, as a function of a defined set of operational conditions of the wind turbine that affect a required cooling capacity within the structural component, the control system augments the recirculating airstream with external air through the external airflow regulator. The external air increases the cooling capacity of the recirculating airstream. The control system also balances the amount of external air introduced into the structural component with the amount of relatively hotter internal air within the structural component to achieve a desired balance of temperature and relative humidity within the structural component.

These and other features, aspects and advantages of the present invention will become better understood with reference to the following description and appended claims.

BRIEF DESCRIPTION OF THE DRAWING

A full and enabling disclosure of the present invention, including the best mode thereof, is set forth in the specification, which makes reference to the appended drawings, in which.

DETAILED DESCRIPTION OF THE INVENTION

Figure 1:
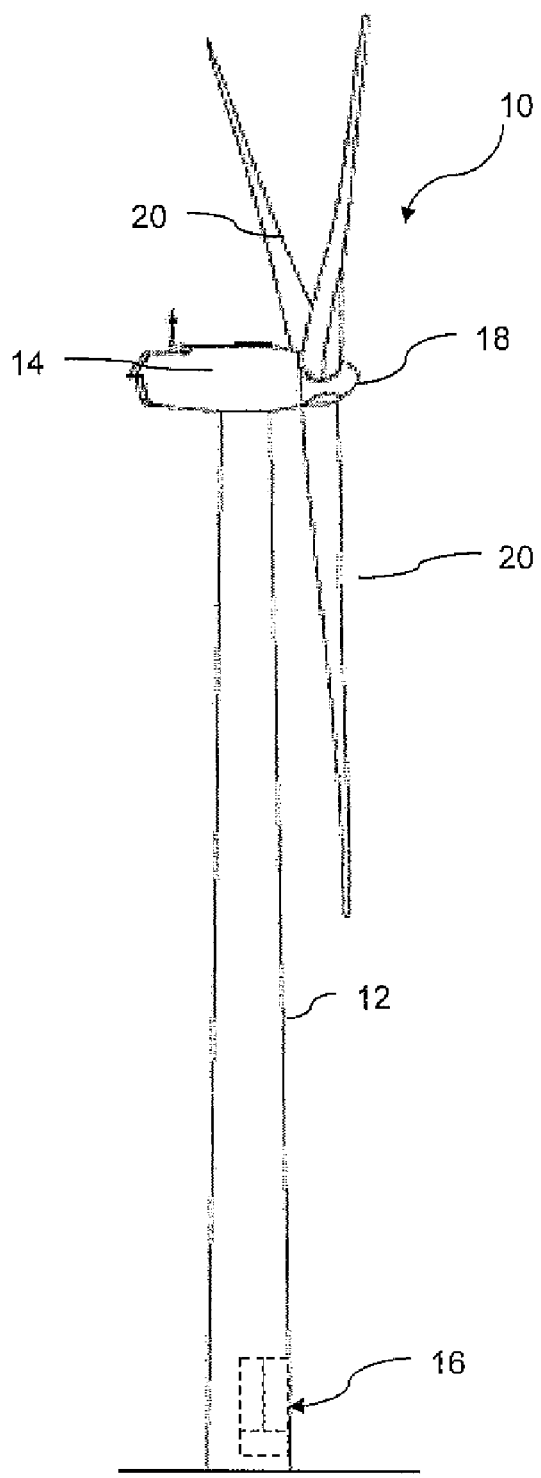
FIG. 1 is a perspective view of a conventional wind turbine, and illustrates power generation or control components housed within the wind turbine tower.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

A horizontal axis wind turbine (hereafter "wind turbine") 10 is illustrated in FIG. 1. However, the present invention can be employed with any configuration of wind turbine, including for example a vertical axis wind turbine. The wind turbine 10 includes a tower 12, which supports the weight of a nacelle 14, blades 19 and rotor hub 18. The tower 12 is often manufactured as a tubular steel structure, and may be erected by stacking multiple tower segments on top of each other. Towers may also be of the lattice (or truss) type, and tubular towers may alternatively be formed of concrete or other suitable materials. The nacelle 14 typically houses the drive train (e.g., gearbox, shafts, couplings, generator, etc.), as well as a main frame (also called a "bedplate") and yaw drives. Other items, such as the control electronics, may also be housed within the tower 12. Typically, the nacelle 14 has an outer skin that is comprised of a lightweight material, such as fiberglass or graphite composite, that functions to protect the drive train and other components from the elements (e.g., rain, ice, snow, etc.).

Various control and power electronics 16 may be located within the tower 12, for example at the base of tower 12. The control electronics may control the various operating modes (e.g., blade pitch angle, start-up or shut-down sequence, etc.) of the wind turbine 10. The power electronics may include transformers and converters used to transform the voltage output of the generator into the proper form for transmission onto the electrical grid.

While housing the control and power electronics 16 within the tower 12 is a typical implementation, it is not the only possible configuration. These components 16 could also be placed in the nacelle. It should thus be appreciated that the cooling system and methodology of the present invention may be used in any structure of the wind turbine in which the control and power electronics 16 are housed, such as the nacelle 14, and are not limited to the tower 12. Aspects of the invention are illustrated and described herein with respect to a particular embodiment wherein the components 16 are housed within the tower 12 for illustrative purposes only.

Figure 2:
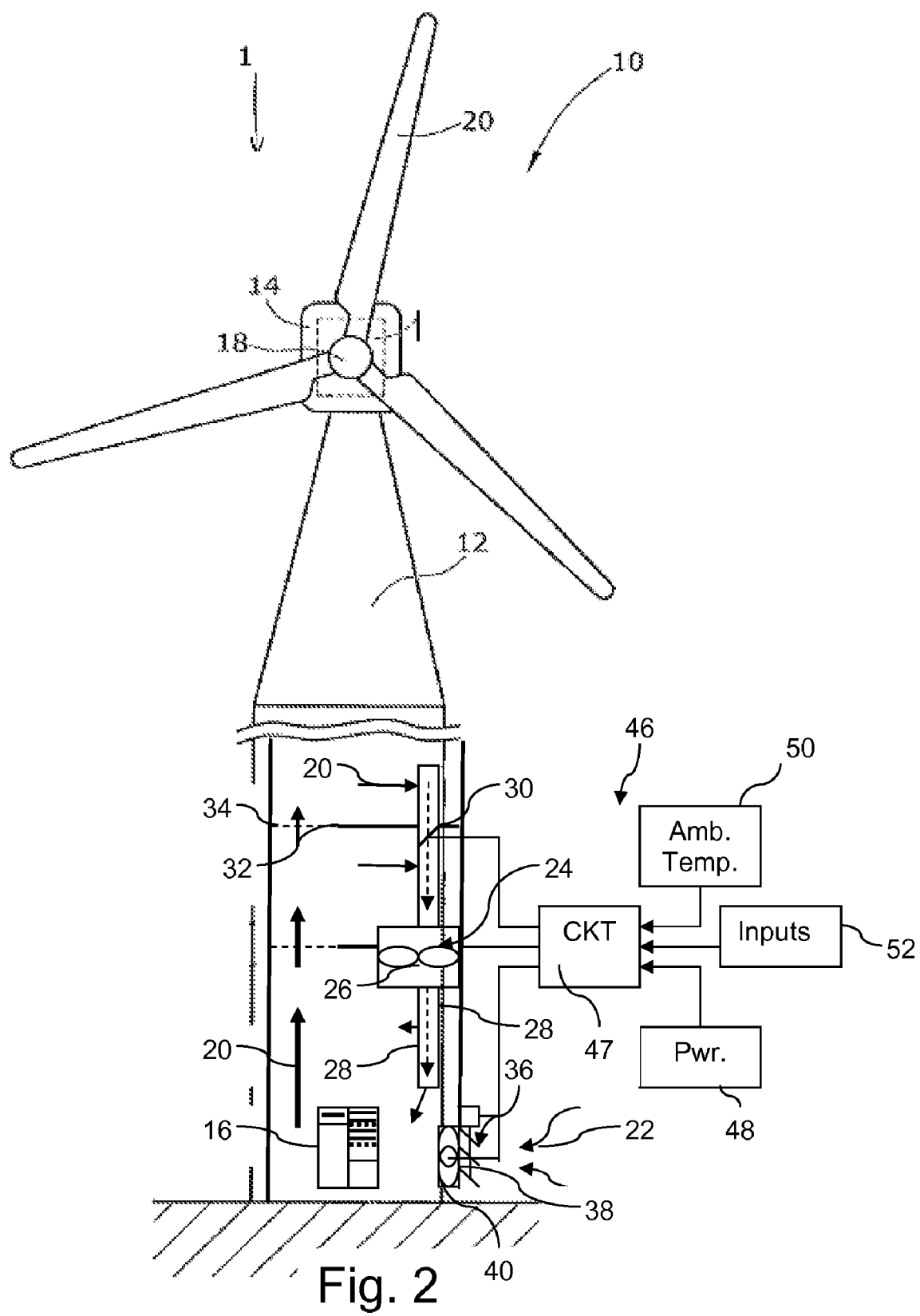
FIG. 2 is a schematic diagram view of an embodiment of a wind turbine structure incorporating aspects of the invention.

FIG. 2 illustrates an embodiment of a wind turbine 10 wherein the tower 12 is the structural component that requires internal cooling. Any configuration of power generation or control components 16 may be located within the tower 12, as graphically illustrated in FIG. 2. As mentioned, the tower 12 may be divided into separate stacked segments wherein a platform 32 divides the different segments. The platforms 32 may include an internal grate 34 or other airflow passage so that internal air 20 may move through the platforms 32 in a recirculating internal airstream.

Any suitable configuration of conventional air handling components 24 may be arranged within the tower 12 to establish the recirculating airstream of internal air 20. In the illustrated embodiment, the air handling components 24 include an internal fan 26 and supply and return ducting 28. A supply duct 28 supplies air 20 into the compartment of the tower 12 in which the components 16 are located, and a return duct 28 is included in each of the upper sections of the tower in which it is desired to establish the recirculating airstream. For example, it may be desired to draw internal air 20 from uppermost ones of the tower sections in certain situations because this air is generally hotter than internal air from lower sections. The hotter air may be needed to control relative humidity within the tower, as discussed in greater detail below. In order to define the extent of the recirculating internal airstream, it may be desired to include controllable dampers 30 within the ducts 28. These dampers 30 would allow for selective control of the internal air 20 drawn from the various segments of the tower 12 depending on the required cooling capacity or relative humidity control needed in the section of the tower 12 containing the components 16.

An external air flow regulator 36 is configured with the tower 12 to control access of external air 22 into the tower. This regulator 36 may include various combinations of components. In the illustrated embodiment, the external air flow regulator 36 includes a conventional power actuated and controllable louvered vent 38. These louvered vents are widely used in air handling systems to control or limit the flow of external air into a structure. The vent 38 may be variably positioned between a fully opened to a fully closed position. The external air flow regulator 36 may also include a fan 40 to assist in drawing external air 22 into the interior of the tower 12. It should be appreciated that the fan 40 need not run in all instances. For example, the fan 40 may be actuated only in situations where an increased volumetric flow rate of external air is required under certain cooling conditions that is in excess of the flow rate that would be sustained by ambient pressure.

A control system 46 is in operable communication with the various internal air handling components 24 and components of the external air flow regulator 36. The control system 46 augments the recirculating internal airstream with external air 22 by controlling the external air flow regulator 36 to increase the cooling capacity of the recirculating internal airstream while also balancing the amount of external air 22 introduced into the tower 12 with the amount of relatively hotter internal air so as to achieve a desired balance of temperature and relative humidity within the tower 12, particularly within the space occupied by the components 16.

It should be appreciated that the configuration of internal air handling components 24, such as the fan 26, dampers 30, ducts 28, and so forth may be controlled so as to vary the recirculating internal airstream within a range of essentially zero flow to an upper flow limit of the air handling components 24. Thus, the volumetric flow rate of the internal airstream can be tuned to achieve the desired temperature and relative humidity within the structure.

The control system 46 establishes the internal temperature and relative humidity within the tower 12 as a function of measured or detected operational conditions that affect the required cooling capacity within the tower 12. These operating conditions may vary widely within the scope and spirit of the invention. In the embodiment illustrated in FIG. 2, for example, the operational conditions or parameters used as control variables by the control system 46 are power generation level of the wind turbine and external ambient temperature. As illustrated in FIG. 2, ambient temperature may be measured by any conventional temperature detection device and supplied as an input 50 to a control circuit 47. Likewise, power generation level of the wind turbine 10 may be supplied as an input 48 to the control circuit 47. Any number or combination of other inputs 52 may be supplied to the control 47, including set points, control parameters, and the like. The control circuit 47, in turn, controls operation of the internal air handling components 24 and external air flow regulator 36 as a function of the various combinations of input factors. The below table (Table 1) is an example of a simplified control scheme that may be used in this regard:

TABLE 1

| Turbine Power Generation | Ambient Temp. | Internal Flow | External Airflow |
|---|---|---|---|
| No | L/H | Reduce/Stop | Close/Reduce |
| Partial | L | Run/Increase | Close/Reduce |
| Partial | H | Run/Increase | Open/Increase |
| Full | L | Run/Increase | Open/Increase |
| Full | H | Reduce/Stop | Open/Increase |

The first operational scenario addressed in Table 1 is essentially zero power generation by the wind turbine and ambient temperature is either low (L) or high (H). It should be appreciated that the low or high temperature ranges may be any temperature between set point temperatures that define the two ranges. In an alternate embodiment, control may be a linear or other proportional function of ambient temperature. In this first scenario, regardless of whether ambient temperature is low or high, the internal recirculating airstream is generally not needed for cooling components within the wind turbine structure. In this case, the internal air handling components 24 may be controlled so as to stop or significantly reduce the internal recirculating airstream. It is also not necessary to augment the reduced or stopped internal airstream with external air. Thus, the external air flow regulator 36 may also be configured to stop or significantly reduce the flow of external air 22 into the structure.

In the next scenario depicted in Table 1, turbine power generation is at a partial level, which may be any level above zero power and below a defined load of the wind turbine. Control may be linear within the defined power range, or step-wise based on sub-ranges. Ambient temperature is low, and the internal air handling components 24 are configured to sustain the internal recirculating airstream at a defined set point rate that is a function of the power level and the temperature. So long as the ambient temperature remains at a set point "low" temperature, it is not necessary to augment the internal recirculating airstream with external air and the external air flow regulator components 36 are controlled accordingly.

In the next scenario addressed in Table 1, power generation is again at a partial level, but ambient temperature is at a high level. With this set of factors, the internal air handling components 24 are configured to maintain the internal recirculating airstream, which may be at a higher rate as compared to the last scenario due to the increased ambient temperature. Because of the high ambient temperature, external air may be needed to augment the cooling capacity of the recirculating internal airstream. Thus, the external air flow regulator components 36 are configured to open and provide an augmenting source of external air.

In the next scenario addressed in Table 1, turbine power generation is at a full level and ambient temperature is low. The internal air handling components 24 are configured to initiate and maintain the internal recirculating airstream, which may be at a greater level as compared to the previous scenarios due to the full power generation of the wind turbine. The external air flow regulator components 36 are again configured to augment the internal recirculating airstream with relatively cooler external air. The external air will provide a significant cooling capacity to the airstream, but may be relatively humid. In this situation, the relatively hotter internal recirculating airstream may be sustained or increased primarily to control the relatively humidity within the tower 12.

In the final scenario addressed in Table 1, turbine power generation is at a full level and ambient temperature is at a high level. In this situation, it may be assumed that maximum cooling capacity is required and, thus, the external air flow regulator 36 may be configured for maximum external air flow. The internal air handling components 24 may be configured to stop or significantly reduce the internal recirculating airstream so as not to introduce relatively hotter internal air into the compartment containing the components 16 that require cooling. In this situation, relative humidity within the tower 12 is not a concern due to the heat generated by the components 16 under full load.

It should also be appreciated that the values indicated in Table 1 may be set point values in a configuration wherein the internal air handling components 24 simply have an "on" or "off" state, and the external air flow regulator components 36 likewise have an opened/on or closed/off state. In other embodiments, control may variable based on a linear or other proportional function.

Figure 3:
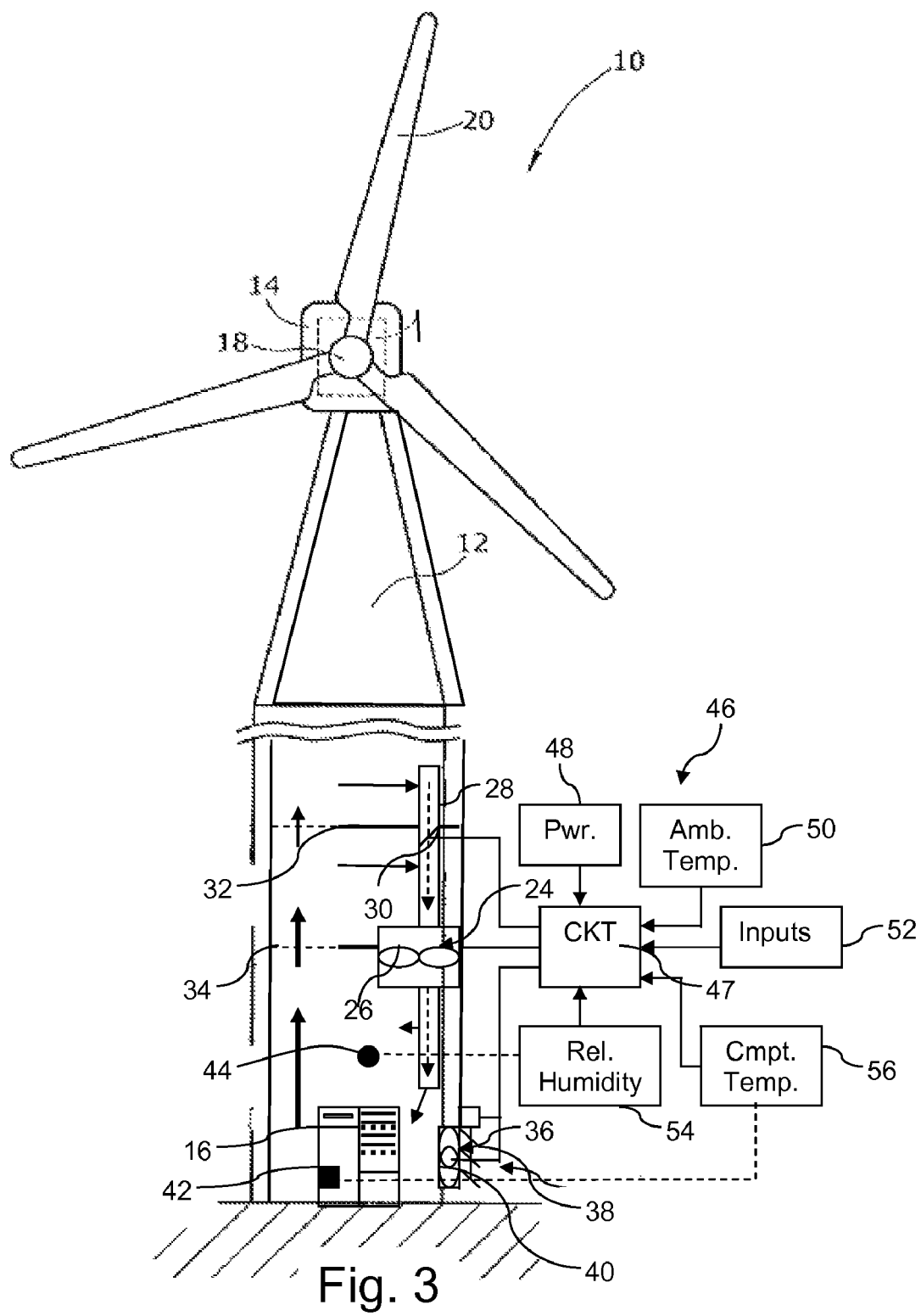
FIG. 3 is a schematic diagram view of an alternative embodiment of a wind turbine structure incorporating aspects of the invention; and, FIG. 4 is a flow diagram of a control scheme related to the embodiment of FIG. 3.

FIG. 3 illustrates another embodiment wherein the set of operational conditions used by the control system 46 for control of the internal air handling components 24 and external air flow regulator 36 are the temperature of a monitored component 16 to be cooled and relative humidity within the turbine structure. For example, referring to FIG. 3, component 16 includes any manner of conventional temperature monitoring device 42 that is in communication with a component temperature sensor 56 that supplies an input to the control circuit 47. Any manner of conventional relative humidity detector 44 is included within the compartment of the tower 12 and is in communication with a relative humidity sensor 54 that supplies an input to the control circuit 47.

Figure 4:
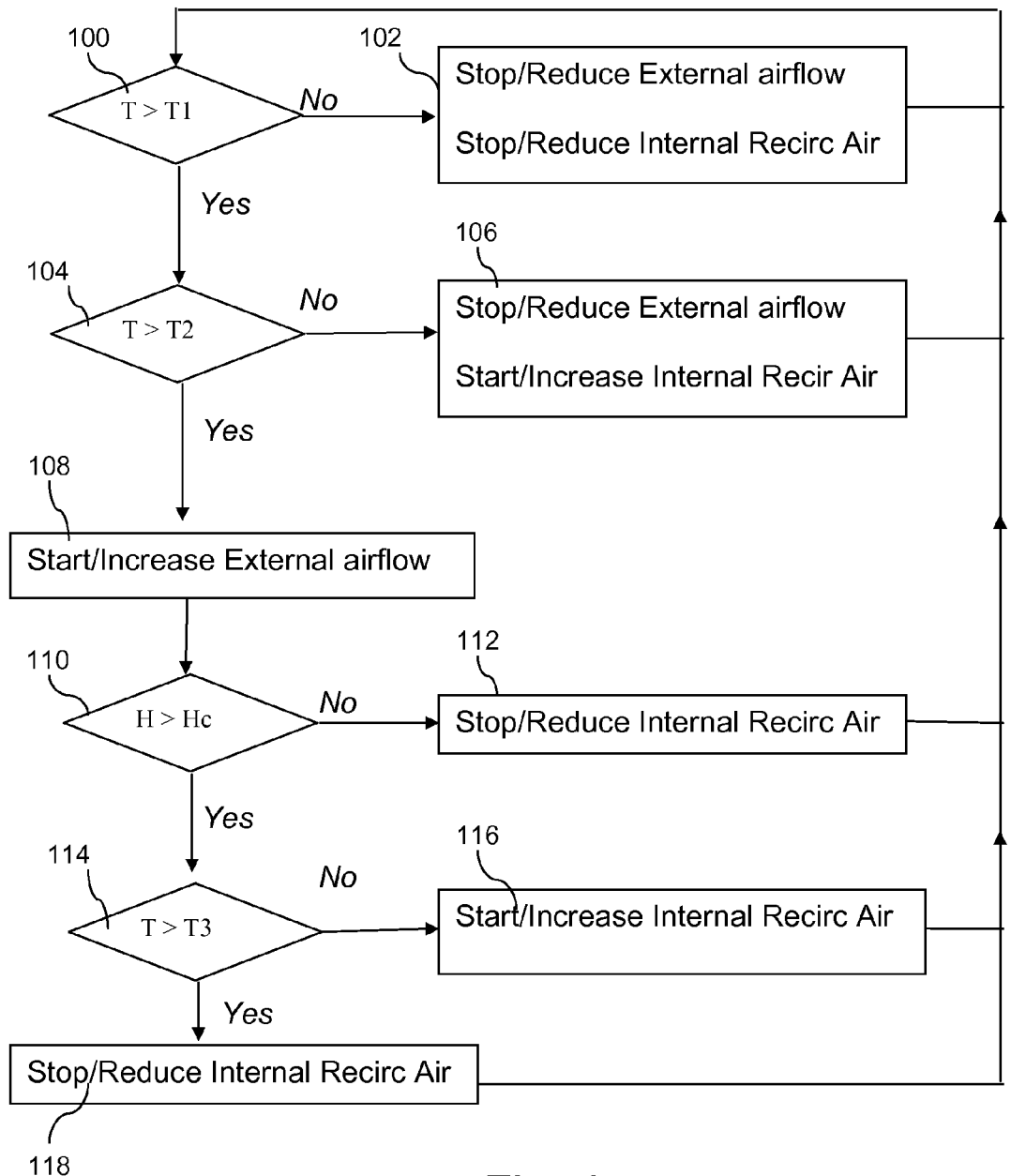

FIG. 4 is a flow diagram of a control scheme that may be utilized with the configuration of components in FIG. 3. This scheme generally reflects that the control system 46 controls the recirculating internal airstream as an initial function of the temperature of the monitored component 16 within the turbine structure. External air is not introduced into the structure until the temperature of the monitored component 16 reaches a set point temperature. After the introduction of external air 22 into the structure, the control system 46 controls the recirculating airstream as a function of relative humidity within the structure.

Referring to FIG. 4, T corresponds to the temperature of the monitored component. T1, T2, and T3 are set point temperatures. H is the relative humidity within the structural compartment. Hc is a set point relative humidity value at which corrosion becomes a concern. In an initial step 100, T is compared to the first set point temperature T1. If T is less than T1, then the internal recirculating airstream is stopped or reduced at 102, and external air flow is generally not needed.

If T exceeds T1, then T is compared to the second set point temperature T2 at 104. If T is less than T2, then the internal recirculating airstream is initiated and maintained at 106, but external air flow still may not be necessary. If T exceeds T2, then the external air flow regulator 36 is controlled to augment the internal recirculating airstream with external air at 108.

Once external air has been introduced into the compartment at 108, relative humidity H becomes a factor in the control scheme. The monitored relative humidity H within in the compartment is compared to the set point humidity value Hc at 110. If the relative humidity H within the compartment is less than Hc, then the relatively hotter internal air is generally not needed to reduce relative humidity H and the internal air handling components 24 may be configured to stop or reduce the recirculating internal airstream at 112. If the monitored relative humidity H exceeds the set point value Hc, then the monitored temperature of the component is compared to the third temperature set point value T3 at 114. If the monitored temperature T is less than T3, then the internal air handling components 24 are configured to initiate the internal recirculating airstream so that the hotter internal air may be used to reduce the relative humidity H at 116. However, if T exceeds the temperature set point T3, then the internal recirculating airstream is stopped at 118 so that the relatively hotter internal air does not increase the temperature T of the monitored component.

The present invention also encompasses various embodiments of a control methodology for cooling components within a wind turbine structure in accordance with the principles discussed above. For example, the method includes establishing a recirculating airstream of internal air within the wind turbine structure. For a defined set of operational conditions of the wind turbine that affect a required cooling capacity within the structure, the method controllably augments the recirculating airstream with external air to increase the cooling capacity of the recirculating airstream as needed. The method balances the amount of external air introduced into the structure with the amount of hotter internal air within the structure so as to achieve a desired balance of temperature and relative humidity within the structure. The given set of operational conditions may, in a particular embodiment, be the ambient temperature and power generation level of the wind turbine, wherein for a given power generation level, control of the internal recirculating airstream and the amount of external air introduced into the structure are a function of the ambient air temperature. In this embodiment, the ambient temperature may be divided into a plurality of temperature ranges, and power generation level may similarly be divided into a plurality of power level ranges. For each combination of power level range and temperature range, control set points are established for control of the internal recirculating airstream and the mount of external air introduced into the wind turbine structure. The control may be linear within the ranges, or held at a constant set point value for each of the respective ranges.

Control of the amount of external air introduced into the wind turbine structure may range from essentially zero or minimal external air to a maximum air flow capability of an external air flow regulator. This control may be linear within the given range, or controlled in a step-wise manner.

In an alternate embodiment, the methodology includes control according to temperature of a monitored component within the wind turbine structure and relative humidity within the structure. In this embodiment, the recirculating internal airstream is initially controlled as a function of the temperature of the monitored component in the structure, and external air is not introduced into the structure until the temperature of the monitored component reaches a set point temperature. After external air is introduced into the structure, the recirculating airstream is controlled as a function of relative humidity within the structure.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for cooling components within a wind turbine structure, comprising:
    establishing a recirculating airstream of internal air within the structure;
    for a defined set of operational conditions of the wind turbine that affect a required cooling capacity, controllably augmenting the recirculating airstream with external air to increase cooling capacity of the recirculating airstream;
    balancing the amount of external air introduced into the structure with the amount of relatively hotter internal air within the structure so as to achieve a desired balance of temperature and relative humidity within the structure;
    wherein the given set of operational conditions are ambient air temperature and power generation level of the wind turbine and for a given power generation level, control of the recirculating airstream and the amount of external air introduced into the structure are a function of ambient air temperature; and,
    wherein the ambient air temperature is divided into a plurality of temperature ranges and power generation level is divided into a plurality of power level ranges, and for different combinations of power level range and ambient air temperature range, control setpoints are established for control of the recirculating airstream and the amount of external air introduced into the structure.

2. The method as in claim 1, wherein the recirculating airstream is generated by controllable air handling components within the structure and is varied as a function of the given set of operational conditions within a range of essentially zero flow to an upper flow limit of the air handling components.

3. The method as in claim 1, wherein control of the amount of external air introduced into the structure is by a controllable external airflow regulator that regulates access of external air into the structure within a range of zero access to a maximum access capability of the airflow regulator.

4. The method as in claim 3, wherein flow rate of external air into the structure is also variably controlled by the airflow regulator.

5. The method as in claim 1, wherein the given set of operational conditions of the wind turbine are temperature of a monitored component in the structure and relative humidity within the structure.

6. The method as in claim 5, wherein the recirculating airstream is initially controlled as a function of the temperature of the monitored component in the structure, wherein external air is not introduced into the structure until the temperature of the monitored component reaches a setpoint temperature.

7. The method as in claim 1, wherein the wind turbine structure is one of a tower or nacelle component of the wind turbine.

8. A method for cooling components within a wind turbine structure, comprising:
- establishing a recirculating airstream of internal air within the structure;
- for a defined set of operational conditions of the wind turbine that affect a required cooling capacity, controllably augmenting the recirculating airstream with external air to increase cooling capacity of the recirculating airstream;
- balancing the amount of external air introduced into the structure with the amount of relatively hotter internal air within the structure so as to achieve a desired balance of temperature and relative humidity within the structure;
- wherein the given set of operational conditions of the wind turbine are temperature of a monitored component in the structure and relative humidity within the structure;
- initially controlling the recirculating airstream as a function of the temperature of the monitored component in the structure, wherein external air is not introduced into the structure until the temperature of the monitored component reaches a setpoint temperature; and,
- wherein after external air is introduced into the structure, the recirculating airstream is controlled as a function of relative humidity within the structure.

9. A wind turbine, comprising:
- a tower;
- a nacelle mounted atop said tower;
- a rotor having a plurality of turbine blades rotatably supported by said nacelle;
- at least one of said tower or said nacelle defining a structural component of said wind turbine to be cooled;
- air handling components within said structural component configured to establish a recirculating airstream of internal air within said structural component;
- an external airflow regulator configured with said structural component and configured to control access of external air into said structural component;
- a control system in operably communication with said air handling components and said external airflow regulator whereby for a defined set of operational conditions of the wind turbine that affect a required cooling capacity within said structural component, said control system augments the recirculating airstream with external air through said external airflow regulator to increase cooling capacity of the recirculating airstream while also balancing the amount of external air introduced into said structural component with the amount of relatively hotter internal air within said structural component so as to achieve a desired balance of temperature and relative humidity within said structural component;
- wherein said given set of operational conditions are ambient air temperature and power generation level of the wind turbine, wherein for a given power generation level, said control system controls the recirculating airstream and the amount of external air introduced into the structure as a function of ambient air temperature; and,
- wherein the ambient air temperature is divided into a plurality of temperature ranges and power generation level is divided into a plurality of power level ranges, said control system configured to control the internal recirculating airstream and the amount of external air introduced into said structural component as a function of setpoints assigned to each combination of power level range and temperature range.

10. The wind turbine as in claim 9, wherein said air handling components vary the recirculating airstream within a range of essentially zero flow to an upper flow limit of said air handling components.

11. The wind turbine as in claim 9, wherein said given set of operational conditions are temperature of a monitored component within said structural component and relative humidity within said structural component.

12. The wind turbine as in claim 11, wherein said control system controls the recirculating airstream as an initial function of the temperature of the monitored component in the structural component and external air is not introduced into said structural component until the temperature of the monitored component reaches a setpoint temperature.

13. The wind turbine as in claim 12, wherein after external air is introduced into said structural component, said control system is configured to control the recirculating airstream as a function of relative humidity within said structural component.

14. The wind turbine as in claim 9, wherein said structural component comprises one of said tower or said nacelle.

15. A wind turbine, comprising:
- a tower;
- a nacelle mounted atop said tower;
- a rotor having a plurality of turbine blades rotatably supported by said nacelle;
- at least one of said tower or said nacelle defining a structural component of said wind turbine to be cooled;
- air handling components within said structural component configured to establish a recirculating airstream of internal air within said structural component;
- an external airflow regulator configured with said structural component and configured to control access of external air into said structural component;
- a control system in operably communication with said air handling components and said external airflow regulator whereby for a defined set of operational conditions of the wind turbine that affect a required cooling capacity within said structural component, said control system augments the recirculating airstream with external air through said external airflow regulator to increase cooling capacity of the recirculating airstream while also balancing the amount of external air introduced into said structural component with the amount of relatively hotter internal air within said structural component so as to achieve a desired balance of temperature and relative humidity within said structural component;
- said control system configured to control the recirculating airstream as an initial function of the temperature of a monitored component in the structural component and external air is not introduced into said structural component until the temperature of the monitored component reaches a setpoint temperature; and,
- wherein after external air is introduced into said structural component, said control system is configured to control the recirculating airstream as a function of relative humidity within said structural component.

* * * * *